G. KRATZ.
Steam Boiler Attachment.
No. 9,347. Reissued Aug. 17, 1880.
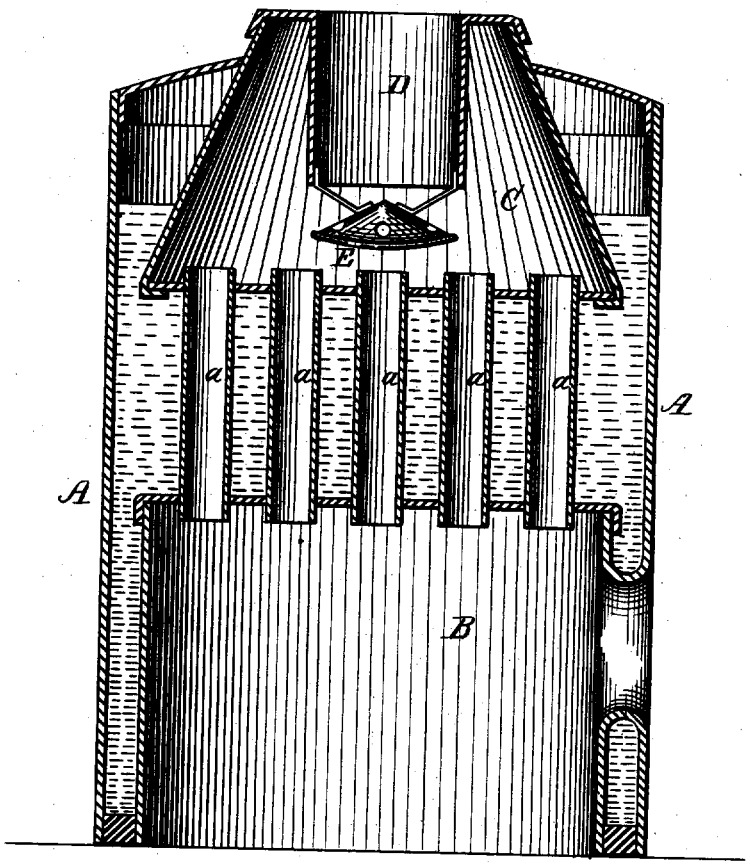
Witnesses
Nat. E. Olphant,
Geo. R. Porter,
Inventor
George Kratz,
per Chas. H. Fowler,
Attorney.
N. PETERS, PHOTO-LITHOGRAPHER, WASHINGTON, D. C.

UNITED STATES PATENT OFFICE.

GEORGE KRATZ, OF EVANSVILLE, INDIANA.

STEAM-BOILER ATTACHMENT.

SPECIFICATION forming part of Reissued Letters Patent No. 9,347, dated August 17, 1880.

Original No. 211,099, dated January 7, 1879. Application for reissue filed July 19, 1880.

*To all whom it may concern:*

Be it known that I, GEORGE KRATZ, of Evansville, in the county of Vanderburg and State of Indiana, have invented certain new and useful Improvements in Steam-Boiler Attachments; and I do hereby declare the following is a full, clear, and exact description of the invention, that will enable others skilled in the art to which it appertains to make and use the same, reference being had to the accompanying drawing, and to the letters of reference marked thereon, which form a part of this specification.

The present invention has relation to certain new and useful improvements in that class of steam-boilers used in upright engines; and the object thereof is to provide means whereby the smoke-box is prevented from becoming red-hot and burning out; also, to distribute the fire equally throughout all the flues and keep them clean.

The invention consists in providing the boiler with a smoke-box extending down into the same and connecting the flues with the fire-box, the smoke-box having at its upper end a central tube or hollow cylinder projecting down into said box.

The invention further consists in providing such tube or hollow cylinder with a deflector or baffle plate suspending from the lower end thereof, as will be hereinafter more fully described.

In the accompanying drawing, which represents a sectional view of an upright boiler embodying my invention, A designates the boiler, with the usual fire-box B and flues *a*, connecting the fire-box with the smoke-box C. Projecting down into the smoke-box C is a central tube or hollow cylinder, D, which may be stationary or removable, as found desirable, and to the lower end of the tube or hollow cylinder is suitably connected a deflector or baffle plate, E.

The advantages gained by the tube or cylinder D extending down into the smoke-box C will be at once apparent from the fact that the tube or cylinder prevents the smoke-box of the boiler from becoming red hot and burning out, as it draws the fire and smoke to the center of the tube or cylinder and away from the shell of the smoke-box. Without the employment of the tube or cylinder that portion of the smoke-box above the water-line would very soon burn out, and the steam-pressure around the box would cause it to bulge and render the boiler worthless.

It should also be noticed that the smoke-box extends down into the boiler some distance from the top thereof, and at its lower end connects the flues with the fire-box below the water-line, the diameter of the smoke-box being less than that of the boiler to allow the water to extend up above the lower end of said box, thereby insuring the flues at all times to be surrounded by water and prevent their burning out.

The deflector or baffle-plate E, being placed at the lower end of the tube or cylinder, serves the purpose to distribute the draft equally throughout all the flues, also preventing fire from running only through the center flues. It further causes a strong draft through the flues, thereby fully utilizing them to the best advantage and keeping them perfectly clean.

Having now fully described my invention, what I claim as new, and desire to secure by Letters Patent, is—

1. In an upright boiler, the combination, with the smoke-box extending down into the same below the water-line and connecting the flues with the fire-box, of a tube or hollow cylinder connected to the smoke-box and projecting down into it below the upper end of the boiler, substantially as and for the purpose set forth.

2. In an upright boiler, the combination, with the smoke-box, of a tube or hollow cylinder extending down into said box and having connected to its lower end a deflector or baffle-plate, substantially as and for the purpose specified.

In testimony whereof I affix my signature in presence of two witnesses.

GEORGE KRATZ.

Witnesses:
J. W. KRATZ,
W. H. BRUNING.